US012718100B2

(12) United States Patent
Joblin et al.

(10) Patent No.: US 12,718,100 B2
(45) Date of Patent: Aug. 25, 2026

(54) METHOD FOR PROVIDING AN AGENT FOR CREATING A GRAPH NEURAL NETWORK ARCHITECTURE AND METHOD FOR CREATING, BY AN AGENT, A GRAPH NEURAL NETWORK ARCHITECTURE

(71) Applicant: Siemens Aktiengesellschaft, Munich (DE)

(72) Inventors: Mitchell Joblin, Munich (DE); Martin Ringsquandl, Raubling (DE); Mike Nicolai, Bierbeek (BE)

(73) Assignee: Siemens Aktiengesellschaft, Munich (DE)

( * ) Notice: Subject to any disclaimer, the term of this patent is extended or adjusted under 35 U.S.C. 154(b) by 1147 days.

(21) Appl. No.: 17/683,757

(22) Filed: Mar. 1, 2022

(65) Prior Publication Data

US 2022/0284296 A1 Sep. 8, 2022

(30) Foreign Application Priority Data

Mar. 8, 2021 (EP) .................................... 21161296

(51) Int. Cl.

| | |
|---|---|
| ***G06N 3/082*** | (2023.01) |
| ***G06F 18/20*** | (2023.01) |
| ***G06F 18/21*** | (2023.01) |
| ***G06F 18/22*** | (2023.01) |
| ***G06N 3/04*** | (2023.01) |

(52) U.S. Cl.

CPC ........... *G06N 3/082* (2013.01); *G06F 18/217* (2023.01); *G06F 18/22* (2023.01); *G06F 18/29* (2023.01); *G06N 3/04* (2013.01)

(58) Field of Classification Search

CPC ............ G06N 3/082; G06N 3/04; G06N 3/08; G06N 20/00; G06F 18/217; G06F 18/22; G06F 18/29

See application file for complete search history.

(56) References Cited

U.S. PATENT DOCUMENTS

2019/0095806 A1 3/2019 Martinez Canedo

FOREIGN PATENT DOCUMENTS

| | | | |
|---|---|---|---|
| CN | 110232434 | A | 9/2019 |
| CN | 111898730 | A | 11/2020 |
| EP | 3462385 | A1 | 4/2019 |

(Continued)

OTHER PUBLICATIONS

Aniket Bajpai et al., “Transfer of Deep Reactive Policies for MDP Planning”, 2018, NeurIPS, https://proceedings.neurips.cc/paper_files/paper/2018/file/74627b65e6e6a4c21e06809b8e02114a-Paper.pdf (Year: 2018).*

(Continued)

*Primary Examiner* — Omar F Fernandez Rivas
(74) *Attorney, Agent, or Firm* — Schmeiser Olsen PLLC

(57) ABSTRACT

Provided is a computer implemented method for providing an agent for creating a graph neural network architecture, which is suitable for providing a prediction of at least one indicator of a complex system and to a computer implemented method for providing such a graph neural network architecture by an agent. Also provided is an agent, a unit for providing an agent, a computer program product, and computer readable storage media.

17 Claims, 9 Drawing Sheets

(56) References Cited

FOREIGN PATENT DOCUMENTS

EP 3958180 2/2022

OTHER PUBLICATIONS

Yang Gao et al., "GraphNAS: Graph Neural Architecture Search with Reinforcement Learning", Aug. 20, 2019, arXiv:1904.09981v2 (Year: 2019).*

R/MLQuestions, How many layers should a NN have? And how do you decide?, Mar. 6, 2018, https://www.reddit.com/r/MLQuestions/comments/82frhv/how_many_layers_should_a_nn_have_and_how_do_you/ (Year: 2018).*

Qu, Wei et al: "ICTA: Intelligent Computing Task Allocation for Efficient Deep Learning in Distributed Edge Computing System of IoT"; 2nd International Conference on Big-Data Service and Intelligent Computation, BDSIC 2020; Dec. 3, 2020 (Dec. 3, 2020), pp. 61-69, XP055853673.

Kaixiong, Zhou et al: "Auto-GNN: Neural Architecture Search of Graph Neural Networks"; arxiv.org, Cornell University Library, 201 Olin Library Cornell University Ithaca, NY 14853, Sep. 7, 2019 (Sep. 7, 2019), XP081474838.

Wan, Jiang et al.; "Future Automation Engineering using Structural Graph Convolutional Neural Networks"; arxiv.org; Cornell University Library; 201 Olin Library Cornell University Ithaca; NY 14853; Aug. 24, 2018; XP081176636; DOI: 10.1145/3240765.3243477; 2018.

Nunes, Matheus et al: "Neural Architecture Search in Graph Neural Networks"; Oct. 13, 2020 (Oct. 13, 2020), Advances in Intelligent Data Analysis XIX; [Lecture Notes in Computer Science; Lect. Notes Computer], Springer International Publishing, Cham; pp. 302-317, XP047569942.

Yang, Gao et al: "GraphNAS: Graph Neural Architecture Search with Reinforcement Learning"; arxiv.org, Cornell University Library, 201 Olin Library Cornell University Ithaca, NY 14853, Apr. 22, 2019 (Apr. 22, 2019), XP081465635.

Srivastava, Nitish et al—Dropout: A Simple Way to Prevent Neural Networks from Overfitting; Journal of Machine Learning Research 15 (2014) 1929-1958.

* cited by examiner

FIG 1

CS
HV
QC
TU
SNM
SML
KG
KG_HV
KG_QC
KG_TU

SNM
Axles
Frontaxle
Frontaxle_indiv
[0..1]
Frontaxle_diff
[0..1]
Rearaxle
Rearaxle_indiv
[0..1]
Rearaxle_diff
[0..1]
Torque coupler
[0..1]
Gearbox
[0..1]
ICE
[1]
Battery
[1]
Vehicle
[1]
Generator
[0..1]
Motor
[1..4]
[*]
[1]

SNM
Hybrid_powertrains [1]
Vehicle [1]
attributes
mass=1000kg
front_tyres=1
rear_tyres=2
Axles [1]
{1.2}
Torque_coupler [0..1]
Gearbox [0..1]
attributes
mass=40kg
Rearaxle [0..1]
{1}
Frontaxle [0..1]
{1}
Rearaxle_indiv [0..1]
Rearaxle_diff [0..1]
attributes
mass=30kg
Frontaxle_indiv [0..1]
Frontaxle_diff [0..1]
attributes
mass=30kg

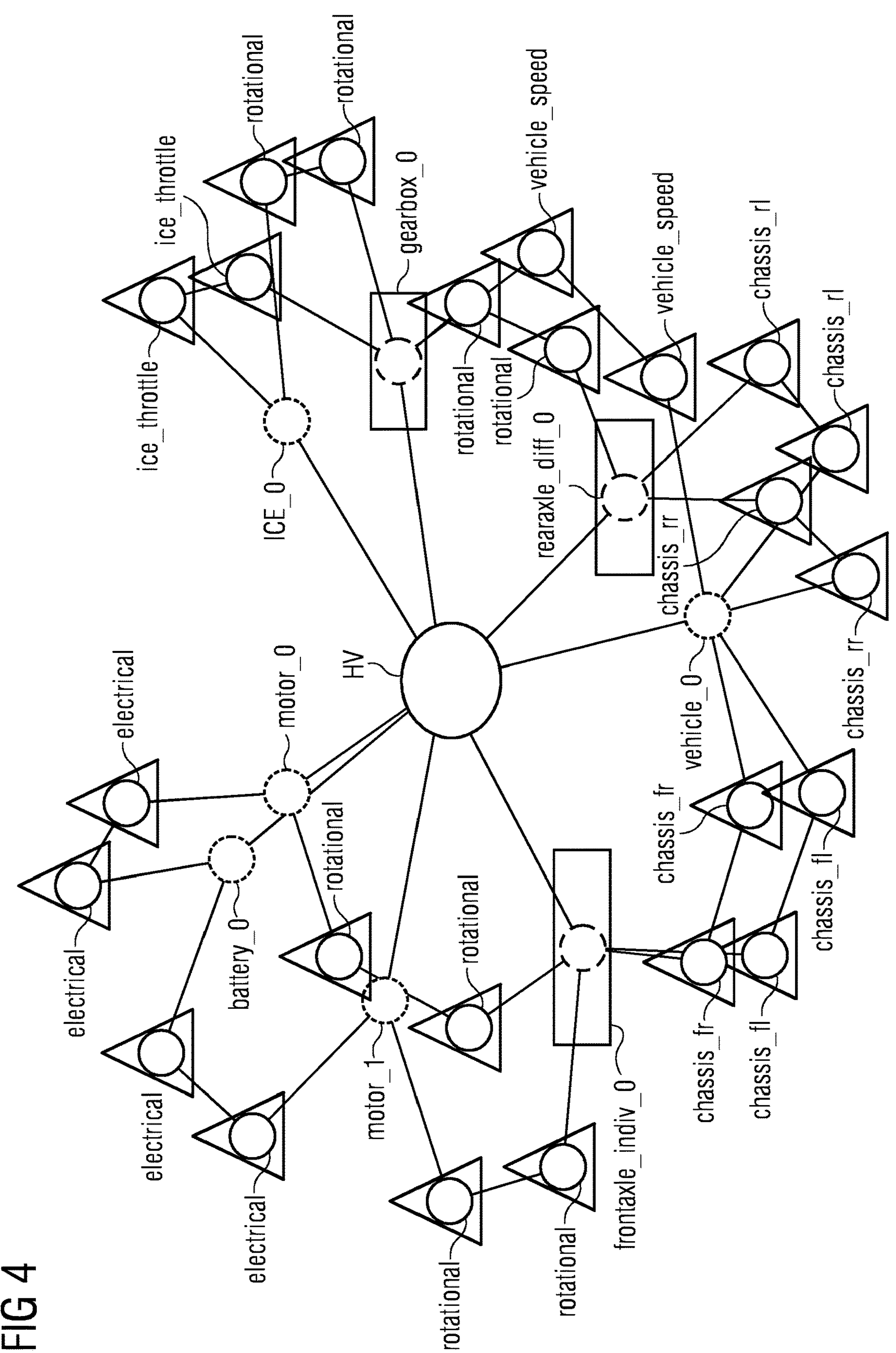
FIG 4
HV
ICE_0
ice_throttle
ice_throttle
rotational
rotational
gearbox_0
vehicle_speed
vehicle_speed
rotational
rotational
rearaxle_diff_0
chassis_rl
chassis_rl
chassis_rr
chassis_rr
vehicle_0
chassis_fr
chassis_fl
chassis_fr
chassis_fl
frontaxle_indiv_0
rotational
rotational
motor_1
rotational
rotational
motor_0
electrical
electrical
battery_0
electrical
electrical GNN
ID
KG
ATT
F1 F2 F3 F4
1.2 50 90 0
2.2 10 0 35
1.0 0 40 90
1.8 30 0 45
NEM
GCNN
NE
latent dims
nodes
GEM
P
OM
DL
KPI

FIG 7

AID

GNN AD
16
GCN
Mean
⋮
1
linear
KG

A

ACT
Remove
GCN
Add
GAT

T&E
16
GCN
Mean
⋮
1
linear

R+0.55

1
SD
SD
SD
2
GNN AD
AID
3
16
GCN
Mean
...
1
linear
SD
Agent
4
ACT
Remove
GCN
Add
GAT
5
T&E
16
GCN
Mean
...
1
linear
6
R+0.55
7

METHOD FOR PROVIDING AN AGENT FOR CREATING A GRAPH NEURAL NETWORK ARCHITECTURE AND METHOD FOR CREATING, BY AN AGENT, A GRAPH NEURAL NETWORK ARCHITECTURE

CROSS-REFERENCE TO RELATED APPLICATIONS

This application claims priority to EP Application No. 21161296.5, having a filing date of Mar. 8, 2021, the entire contents of which are hereby incorporated by reference.

FIELD OF TECHNOLOGY

The following relates to a method for providing an agent for creating a graph neural network architecture, a method for creating, by an agent, a graph neural network architecture, an agent and a unit for providing an agent. Further, the following relates to a computer program product and computer readable storage media.

BACKGROUND

During the design or configuration of a complex system, engineers have to find a solution, so that the complex system provides a sufficiently good performance. By use of their domain knowledge a system that satisfies a number of functional and non-functional requirements is developed. For cost and efficiency reasons this development is done in a first step on a computer, before prototypes are produced. The found solution-is, e.g., a corresponding component of a car, is provided from the engineering service to a customer. The found solution—depending on the manufacturer's decision—may be realized, e.g., as prototype, which might then, —possibly after amendments, be put into practice.

An example of a complex system could be a hybrid vehicle where a function requirement is speech recognition capability and a non-functional requirement is reaching 100 kilometers per hour from a standstill in four seconds without consuming more than 20 ml of fuel. In this context, function requirements specify what a system should or should not do, e.g., to have speech recognition or acceleration capability, whereas non-functional requirements specify how it should be done, e.g., such that the consumption restriction is obeyed. As there are many options to adapt the complex system, this task relies on the engineer's experience who must consider a multitude of possible discrete configurable options, e.g., electric motor and/or internal combustion engine, and continuous options, e.g., engine size or battery capacity. The number of possible systems that can be generated by varying the options grows exponentially and very often only a small portion of those possibilities satisfies the requirements.

Engineers leverage their experience to decide which design are most promising, but still require feedback from simulation environments to determine if the requirements are satisfied.

A simulation means that a behavior of the complex system is approximated by a deterministic model. Depending on input data and output data of interest, the deterministic model determines the behavior. However, simulations are often time consuming as e.g., many interdependencies must be considered and reflected in the respective algorithms used for the simulation. Sometimes also the interdependencies are not known and can therefore not enter the simulation.

Therefore, to provide a quick feedback to the engineer, during the recent years as an alternative the use of neural networks has been proposed. By a neural network the behavior of the complex system can be modeled. For this, the neural network is trained by using training data in order to reflect the complex system's behavior. During the training, feedback has to be given on the results obtained by the neural network in order to gradually develop a sufficiently good representation of the complex system by the neural network.

This "training" or feedback process requires a lot of time and work. Moreover, there are of course many different complex systems or problems to be explored in the complex systems and the above-described process must be performed for every single complex system or problem. Therefore, a lot of time and money is required to perform this engineering task to find an optimum design e.g., for a hybrid car or a production line.

SUMMARY

An aspect relates to a possibility for making the design process more efficient and thus providing the possibility to improve the design process.

The following relates to a method for providing an agent, which can create a graph neural network architecture.

The following further relates to a method for creating a graph neural network architecture by an agent, an agent, a unit for providing such agent, a computer program product (non-transitory computer readable storage medium having instructions, which when executed by a processor, perform actions) and storage media with such computer program product.

It is one consideration in the context of embodiments of the invention to create a graph neural network not by hand, i.e., by an engineer using his/her technical domain knowledge and knowledge about how to implement this while using neural networks, but rather have this graph neural network created by a software adapted to this task by machine learning.

In particular, this has the advantage of reducing costs. Further, the task can be performed faster. Even further, more possibilities for the graph neural network can be explored, which leads to better predictions by the created graph neural network. The predictions contain technical indicators, e.g., fuel consumption, of a complex system, e.g., a hybrid car. Therefore, the design process for the complex system can be significantly improved. Even further, thus unknown dependencies between a large variety of systems can be considered.

An agent is a unit which can perform actions to create the graph neural network architecture autonomously. It may be a piece of software which has undergone the process of machine learning.

A graph neural network architecture is a combination of neural network components of which at least one is a graph neural network layer. In graph neural networks (GNNs) dependencies in graphs can be captured. By a graph which contains nodes and edges to interconnect the nodes a complex system, i.e., a system having multiple components and interdependencies can be described.

For the iterative process in which the agent learns how to modify a GNN in an advantageous way, a variety of system designs of complex systems is provided to the agent. The variety may be chosen such as to provide different system designs in the same technical field. In the example of the hybrid car, they may comprise different implementations of hybrid cars.

Alternatively, or additionally, the variety may comprise system designs of cars with only electrical drive technology. Additionally, system designs of purely combustion engine-based drive technologies may be added. Further, other systems using electric motors such as quadrucopter may be part of the variety.

According to an embodiment the iterative process is a machine learning process, by which a feedback loop in the iterative process can be speed up. In particular the machine learning may be a reinforcement machine learning.

An iterative process, in particular a machine learning process, is started by the agent. In this iterative process an initial starting graph neural network architecture is modified in at least one aspect, e.g., adding a graph convolutional layer, and thus a different, intermediate graph neural network architecture is obtained.

This intermediate graph neural network architecture is then trained with training data for the chosen system design describing a complex system, e.g., a specific hybrid car.

For example, the training may be finished, if a certain amount of training data provided for the hybrid car has been used or if a predefined set of indicators determined at the end of a loop the is within a certain range around the value expected from the actually measured data or also after having used a certain amount of time.

According to an embodiment, the training may have the same training parameters such as e.g., batch size, for each loop. Thus, the results of the determination of the indicator is straightforward comparable.

After the training is finished, a prediction of at least one indicator for the complex system and its quality is determined. For example, quality may be determined by accurateness or/and required training time.

From the quality of the prediction, a reward value is calculated. For example, the reward value depends on how much improvement in the quality of the prediction has been achieved with the current intermediate graph neural network in comparison to the previous intermediate graph neural network.

According to an embodiment, for the first loop the reward function has a positive value, e.g., by ensuring that an initial quality value is zero or a negative number. In this way it can be proceeded to the next loop even if there was no previous graph neural network This process of modifying, training, determining, evaluating until deriving a reward function is repeated until an exit criterion is met, i.e., the predictions meet a predefined property, e.g., are within a predefined accuracy range.

The agent then chooses a new system design and starts to perform a new iterative process again until a suitable graph neural network architecture is achieved for the newly picked system design.

This is repeated for a plurality of system designs until an agent exit criterion for the agent is met. According to an embodiment, the agent exit criterion is that all available system designs out of the variety have been used in the iterative process. Thus, it can be ensured that al available information has been used and that the agent could gain the widest possible "experience".

According to another embodiment, the agent exit criterion is met if the iterative process has gone through a predefined subgroup, e.g., all system designs for hybrid vehicles. This reduces the time needed to obtain an efficient agent. Moreover, most of the information contained in the system design, which is relevant for hybrid cars should be collected in this way if there are no technical overlaps with system designs for e.g., production systems.

The thus obtained agent is able to create a suitable graph neural network architecture also for unknown system designs, e.g., a new hybrid car.

The suitable graph neural network architecture is obtained when the agent has finished the iterative process of modifying the graph neural network architecture, i.e., the exit criterion is met. Then the last intermediate graph neural network is taken as the suitable graph neural network architecture.

Then predictions of indicators, e.g., key performance indicators for this new hybrid car can be made in a shorter time than if it was designed by a machine learning expert and moreover more or predefined information can be used for this design. This can make the predictions more reliable and also more understandable. Furthermore, the predictions become more accurate, e.g., because more relevant information and their—before unknown—interdependencies are considered.

A unit that provides such an agent may be a computing system with a collection of software, e.g., Siemens TIA or the Siemens Simcenter™. The computing system comprises at least one processing unit, storage unit and communication interface. For example, the agent may be executed at a computer system on the provider's side and a customer enters via the communications means its system design and receives the desired predictions.

According to an embodiment, the agent may be downloaded from there or provided as computer program otherwise, e.g., on computer readable storage media

BRIEF DESCRIPTION

Some of the embodiments will be described in detail, with reference to the following figures, wherein like designations denote like members, wherein:

FIG. 1 shows an example of how actual complex systems, i.e., real-world systems are translated into knowledge graphs by using a standardized modelling language;

FIG. 4 shows the knowledge graph of the hybrid vehicle at the top right center of FIG. 1 in more detail;

FIG. 7 shows a schematic overview of creating a graph neural network architecture by an agent for a specific system design;

DETAILED DESCRIPTION

Figure 2:
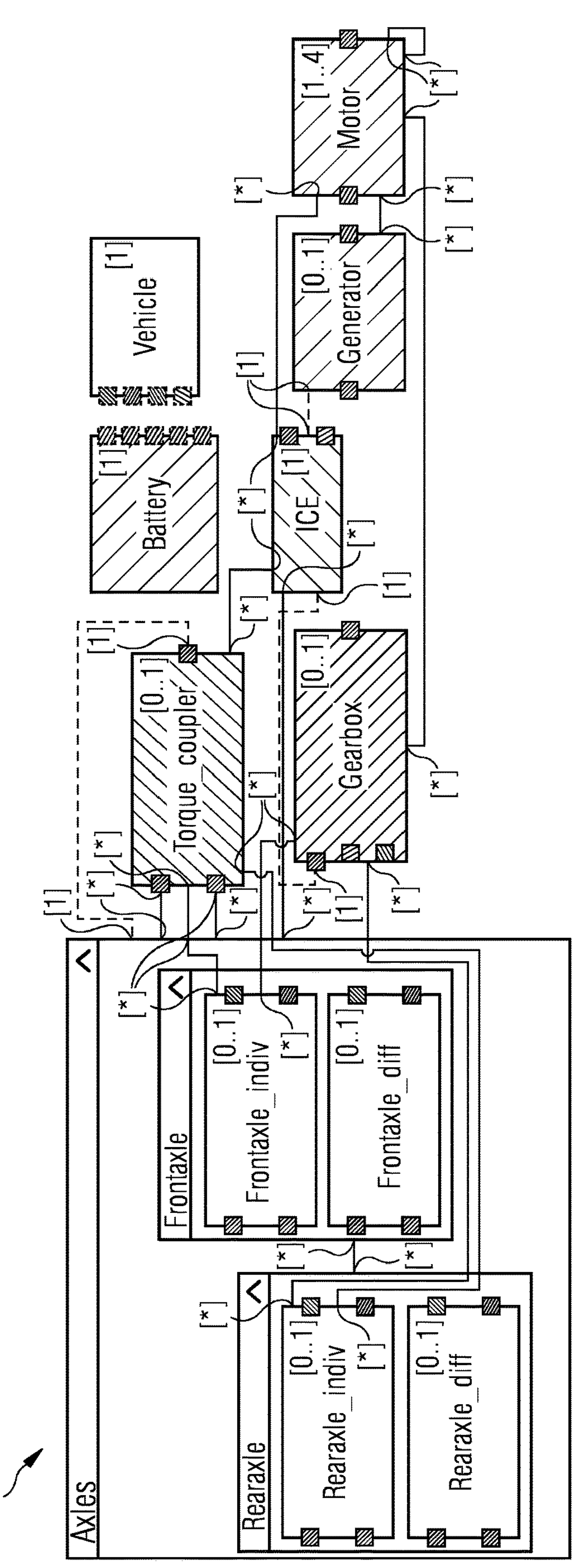
FIG. 2 shows an example of the standardized network model of FIG. 1, center, in more detail.

Software suites, i.e., collections of software available to support the design or and configuration of complex systems, are offered for various applications such as construction tasks, industry automation designs or chemistry. Examples at Siemens are e.g., SimCenter™ or TIA (totally integrated automation) portal.

These tools can be used to create a wide variety of systems ranging from hybrid vehicles and quadcopters to factory automation systems.

Given the diversity of the application domains, it is a challenge to design a single machine learning model that is capable of learning under all application scenarios. The typical approach is to design a separate model for each application area, however, since the provider of the software suit is often unaware of all the system types a user might design this standard approach is inadequate. Furthermore, designing a separate machine learning model for each system type is very time consuming and requires the input from a machine learning expert.

The context of embodiments of the invention comprises using

- a highly flexible network structure to represent a system design, which describes a complex technical system such as a hybrid car, a quadcopter, a production line etc.
- graph neural networks (GNN) which are capable of operating on these network structures, i.e., can extract relevant system design information.
- a neural network architecture search which can automatically construct optimal graph neural networks for a wide variety of domains. By a domain a certain group of system designs is meant, e.g., a group of hybrid cars or a group of production systems. In the context of embodiments of the invention a machine learning approach is proposed to speed up the process of constructing the "optimal" graph neural network.
- a standardized language (i.e., ontology) for describing the elements of a complex system as a knowledge graph that makes the neural architecture search more efficient.

Up to now often simulations have been used to provide, for a given system design, a simulation environment which provides the feedback to the design process regarding performance properties of the system.

As an addition, modeling of the complex system by a neural network has been used. However, for each complex system, e.g., hybrid vehicle, a separate machine learning model needs to be developed and trained by an ML (machine learning) expert.

Figure 1:
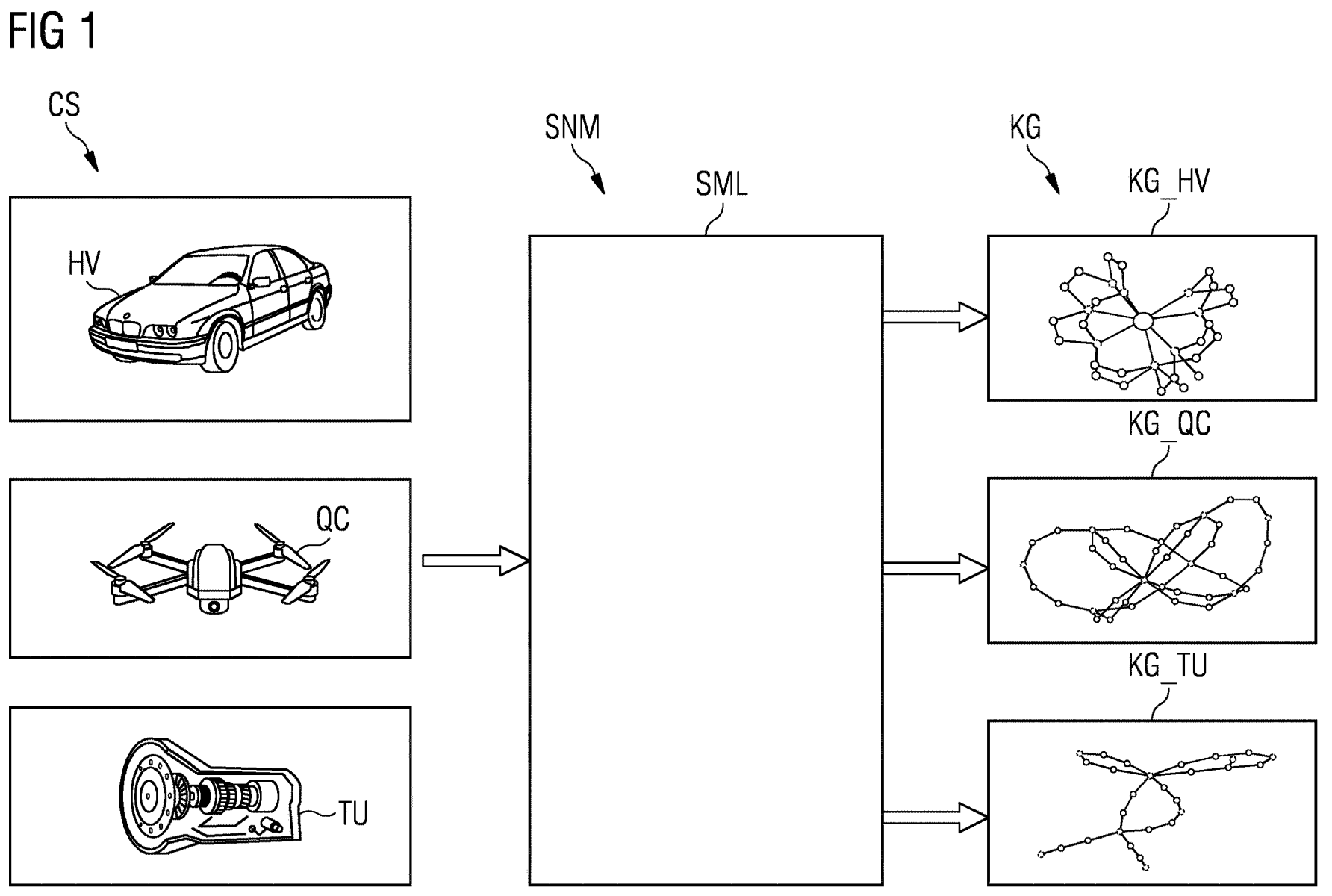

Knowledge Graph Representation of Complex Systems (FIG. 1)

A representation of complex systems by knowledge graphs and attributes is also described in the application EP 20191767.1 by the same inventors in particular in the description of FIGS. 1*a* (representation of a complex system by a graph) and 1*b* (numerical attributes).

Investigations resulted, that in view of the diversity of complex system types, a standard tabular representation which is used in machine learning according to the conventional art, does not provide the necessary flexibility to capture all the nuances of the problem domain. For this reason, according to embodiments of the invention, it is proposed to model all systems as a knowledge graph composed of entities and relations.

To translate the complex system designs into a knowledge graph an ontology, i.e., standardized language that describes elements of complex systems and relationships between the elements, is used. For example, by describing all motors, electrical components, hardware interfaces using a common language, the machine learning solution can learn to leverage the commonalities between differing system types and more efficiently find performant machine learning models as will be set out below with regard to the figures.

With regard to FIG. 1, it is explained how from a complex system CS a knowledge graph KG is produced. Descriptions of complex systems CS are translated into knowledge graphs KG using a standardized modelling language. On the left are representations of a particular design for three different complex systems CS.

Figure 5:
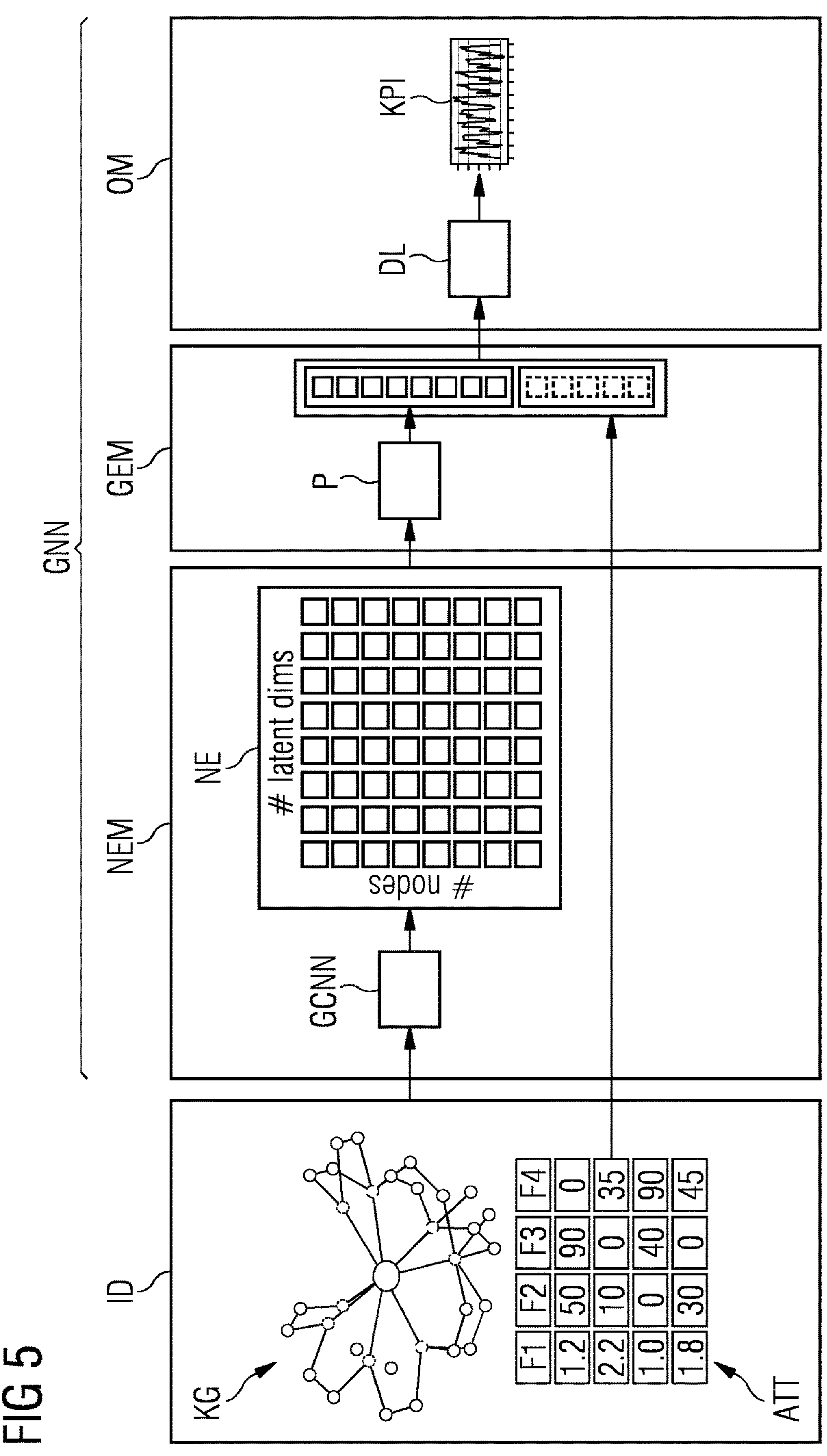
FIG. 5 shows a high-level overview of possible components used in a neural network architecture which is obtained by machine learning and which describes the complex system.

A system design SD is then composed of a knowledge graph KG and optionally attributes ATT, which serves as input data ID for the graph neural network architecture GNN, see FIG. 5.

A system design SD can result from actual systems in the real world or from simulated data. For a variety of systems as used for training the agent systems designs from the real world, simulated system designs or/and combinations thereof can be used. According to an embodiment also for an individual system design SD part of the underlying information is taken from actual measurements and other parts from simulations.

According to an embodiment, there is at least one group of attributes ATT which refers to a subset of the nodes, e.g., a motor property refers only to nodes related to the motor. Alternatively, or additionally, there is a first group of attributes which refers to a first subset of nodes and a second group of attributes which refer to a second subset of nodes etc.

According to an embodiment, the attributes ATT are combined with graph encoded data only after the graph encoding. Thus, for attributes ATT not relating to all nodes, these can be adequately considered. Using them already for the node encoding would it make necessary to set the value of the attributes e.g., to 0, but as 0 could have the meaning "non applicable" or "value is zero" this would lead to ambiguities or sparsity issues when doing the node encoding.

The shown system type on the top is a hybrid vehicle HV with its electric and fuel driven power train, in the middle there is a quadcopter QC with its 4 rotors, and on bottom there is a transmission unit TU.

These are only exemplary systems, the system could be as well a manufacturing unit, a robot, a chemical substance or molecule, a computer system, a smart energy system in a house etc.

The data relating to these complex systems CS are used as input data for a standardized network model SNM at the center of FIG. 1 which uses a standardized modelling language SML to describe the respective complex system CS with its components and their relationships.

As output data the knowledge graphs KG on the right are produced, on top the knowledge graph for the hybrid vehicle KG_HV, at the center the knowledge graph KG_QC for the quadcopter QC and at the bottom the knowledge graph KG_TU for the transmission unit TU. These represent the system design on the left using a standardized modeling language SML for the elements of the design and their relations. These elements can be e.g., motor types, electrical components, hardware interfaces etc.

A knowledge graph KG depicts nodes and edges between the nodes, the edges can be unidirectional or bidirectional. A node may represent an element and an edge a relation between elements. This will be further explained in relation with FIG. 4.

By a knowledge graph KG the data structure of the complex system CS is described. The data structure is a formal representation of the engineering specification, which may be provided by a customer, e.g., a car manufacturer who needs in return a description of a specific design for producing prototypes, real car components, cars etc. This multi-relational engineering specification comprises heterogenous information about components, component properties and how and which of the components are related. From this specification, nodes and further information describing the nodes, e.g., a type of the node or an attribute of the node and the edges, i.e., connections between source and target nodes, can be extracted, e.g., by using graph regressors, and form the knowledge graph, which serves as input data for a graph neuronal network GNN, e.g., a graph convolutional neural network.

FIG. 2 depicts the standardized network model SNM (center of FIG. 1), in which the system design of the complex system CS is described using a standardized modeling language SML in more detail.

In FIG. 2, as an example, direct relations between the axles with other components of the vehicle such as gearbox, torque coupler are shown as well as indirect relations, i.e., relations via another component to the motor or generators. The squared units at the edges of the components denote a possible way of relation, e.g., electrically or mechanically.

Figure 3:
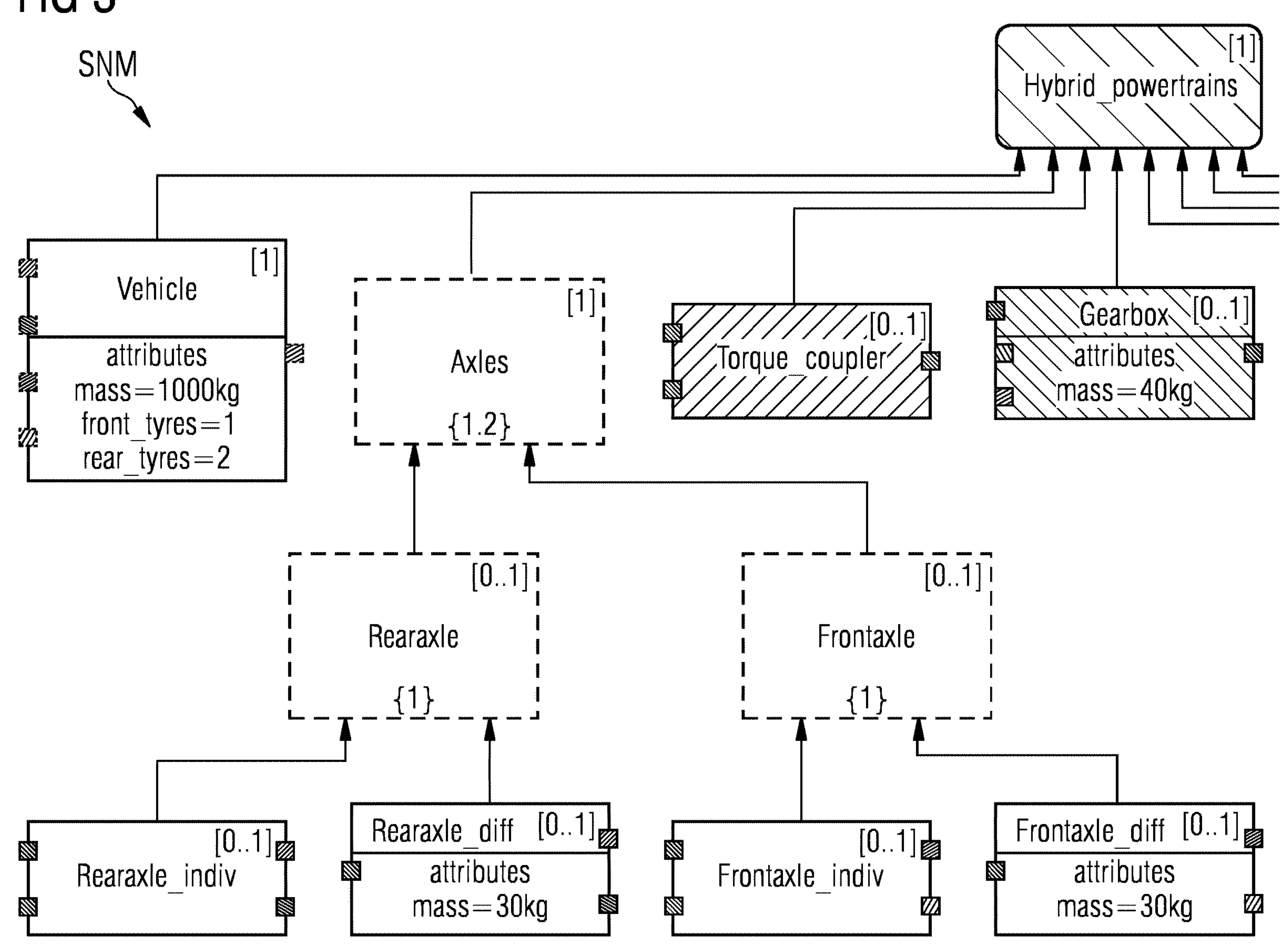
FIG. 3 shows an example of the standardized network model of FIG. 1, center, in more detail.

In FIG. 3 attributes of some of the components of FIG. 2 are shown as rectangular boxes. These attributes denote numerical values of a component, such as the number of front or rear tires in the component "vehicle", the mass or the number of axles. In the shown example all of the components have attributes.

These relationships and attributes are used when translating or encoding the description of the complex system CS into a knowledge graph KG.

Knowledge graphs KG have, e.g., the following advantage:

The usual representation of an engineering design is a table.

The disadvantage of tables is that complex relations thus as multi-relations cannot be captured. Another disadvantage is that a table, if it should be used as input data, needs always to have the same structure, e.g., the same number properties, e.g., that the number describes the number of axles needs e.g., to be contained in a column. In this case the number of columns needs then to be the same.

Hence, the graphical representation of the technical system, e.g., the hybrid car, is much more flexible, e.g., if the number and types of components vary, do not require an ordering which would lead to permutation variant representations and moreover can contain the plurality of relations that exists. Further details are described with relation to FIG. 3 of application EP 20191767.1 by the same inventors. FIGS. 3*a* and 3*b* of EP 20191767.1 show an example of isomorphic data structures. For the machine learning it is important that identical or isomorphic structures do not lead to different input information. The advantage of applying the proposed graph convolutional formulation is that it is permutation invariant, as long as the node features are not encoded with the node ID. This is overcome by using the node type, e.g., motor, battery, etc. Then e.g., in a matrix $H^{(0)}$ i.e., a matrix before application of a Graph Convolutional neural network, all features of e.g., node 1 would be grouped together in a column, but it would not be required e.g., that it is column 1.

As said before, from the data topology or structure a sort of adjacency matrix $\tilde{A}$ describing the link structure of the data architecture is derived and enters as input value the GCNN. When deriving a matrix from the data structure a numbering of nodes has to be introduced in order to put e.g., connections starting from node 1 to other nodes in row 1 and connections leading to node 1 in column 1 and so forth for columns 2, 3, 4 and 5. If the numbering would be changed, the result would be a different representation, i.e., a different matrix. In other words, by permutations different matrixes are obtained which describe the same data structure. This fact hampers the machine learning process, because all the possible permutations which can be a high number would have to be used as training data. Therefore, a permutation invariant representation of the data structure is used.

To obtain such a permutation invariant representation of the data structure, the attributes of each node are used. By adding the attributes to individual nodes, they are made different from each other so that they are not exchangeable anymore. Then, for two isomorphic designs, even if the node orderings are different, the machine learning model recognizes the designs as identical since the graph convolutions are designed to be permutation invariant.

In FIGS. 3*a* and 3*b* of EP 20191767.1 two node structures are depicted. As said, if such a node structure is represented by a matrix, an ordering has to be given to the nodes, e.g., each node is given a number. The node structures shown in FIGS. 3*a* and 3*b* of EP 20191767.1 are isomorphic, i.e., unambiguously reversible, just the nodes are numbered differently. By adding the attributes a structure as shown in FIG. 3 a and b of EP 20191767.1 is not any more represented by the same matrix as the structure in FIG. 3 b of EP 20191767.1, because the nodes are not interchangeable anymore, e.g., node 5 is not the same as node 3, because it has e.g., different features, e.g., node type, attributes, ports etc.

In FIG. 4 the knowledge graph of the exemplary hybrid vehicle HV in FIG. 1 top on the right side is shown.

In the graphical representation there are nodes, which describe components, assets and ports and which are identified by a node type. The root or central node or architecture node HV describes a specific architecture.

For a planned hybrid vehicle HV, various data architectures can be created so that different embodiments of the vehicle are described which differ e.g., in one or more components.

The specific hybrid vehicle HV has several components, e.g., motor 0 MO and motor 1 M1, battery 0 B0, vehicle chassis V0 and internal combustion machine ICE_0.

In FIG. 4 these components are depicted with a circle and are directly connected by an edge to the root of the graph representing the hybrid vehicle HV. Optionally, there are some components that are not varied during the current task, e.g., number of tires, axles, gearbox etc. In FIG. 4 such invariable components or "assets" are depicted with a square.

In the following invariable components or assets and components are referred to as "components".

A component has one or more ports across which a relation to other components is established, e.g., electrically, mechanically, e.g., rotationally or via the chassis, via a specific throttle of the internal combustion machine etc. These possible relations via the ports are depicted by a triangle and form again nodes in the data topology.

A port represents a facility for an, e.g., mechanical or electrical interaction. Each edge represents a correlation between the two connected components, e.g., a mechanical coupling constant between two chassis parts or torque coupler between an internal combustion engine and a front or rear axle, an electromagnetic coupling between components of an electric motor.

These relations may lead via one edge from one component to another. This is depicted in FIG. 4 between motor_1 and motor_0 with one edge via their port for rotational interactions.

The components, invariable components or assets, and ports constitute nodes of a data topology centered around a root node denoting a specific architecture of the technical system, e.g., the hybrid vehicle. The nodes of the data topology are connected by edges denoting a correlation between two nodes. This correlation can be unidirectional or bidirectional.

Application of Graph Neural Network for Performance Predictions in Complex Systems Described by Knowledge Graphs (FIG. 5)

Based on the knowledge graphs KG, performance predictions should be made using a suitable graph neural network architecture.

It is an aspect of embodiments of the invention to obtain such a suitable neural network architecture by using a machine learning method.

In FIG. 5 a high-level description of the elements used for designing a suitable network architecture, which is capable of predicting a performance characteristic of a complex system, is shown. This design is done by machine learning and results in a suitable graph neural network GNN architecture.

The shown suitable graph neural network GNN architecture for describing a complex system CS is comprised of a node encoding module NEM, into which the input data ID are fed.

The input data ID is the knowledge graph KG. Optionally the knowledge graph KG contains attributes ATT to individual nodes. By knowledge graph KG and optionally the attributes ATT a specific system design of a complex system can be described.

NEM (Node Encoding Module)

Data obtained from the node encoding module NEM are fed into a graph encoding module GEM. The thus processed data then enter an output module OM.

The data obtained from the node encoding module NEM (NEM data) represent "low level" features, i.e., features or properties solely referring to a specific node. In other words, everything relevant for the identity of a specific node in the given complex system is contained. For example, the NEM data may represent a motor with its weight, electrical or mechanical connection possibilities. In the example of the quadcopter QC, e.g., it may further represent rotational speed and direction, bus ports. In the example of a transmission unit TU further connections to gearset, brake or clutch may be considered. In other words, the intermediate graph neural network GNN learns vector representations for all nodes which capture the structural identity of each node (e.g., motors, batteries etc.) by encoding adjacency information.

In another example of industrial automation, it may represent a specific robot in a production line and its properties. In another example of material science, it may describe properties of an individual molecule.

GEM (Graph Encoding Module)

The data obtained from the graph encoding module GEM are referred to as GEM data and represent information on the overall system, e.g., the effect of connections between various nodes.

In the example of the hybrid vehicle HV it may represent oscillations that travel over the whole vehicle due to the various masses of the components motor, battery and the couplings strengths, e.g., stiffnesses, of the relevant connections. In the example of the quadcopter QC it may represent the interaction between the four motors and the shape of the wings, so that e.g., impacts on the direction it moves can be deduced.

In another example of industrial automation, it may represent the impact a robot at the entry of the production line may have on a further processing device somewhere else in the production line. In another example of material science, it may represent a property of a substance composed of various molecules as a whole (and not of single molecules), e.g., its viscosity.

In the shown example of graph encoding module GEM a Pooling P and a combination of these data and attributes ATT takes place.

OM (Output Module)

As said, the data obtained from the graph encoding module may be optionally pooled. The data cannot be directly interpreted, i.e., do not show directly e.g., a physical or technical or chemical meaning. What is done in the output module OM is to extract a useful indicator from the graph encoded data, which are optionally pooled. Therefore, the multi-dimensional encoded information is transformed to e.g., a continuous numeric output or vector, w. For this, a so called "dense layer" is used which can be regarded as a "feed forward neural network" or multilayer perceptron.

In the output module OM the graph encoded data, which are optionally pooled, as shown in Pooling P, are transformed such that the dimension is reduced. For example, they are used as input for dense layers DL. The dense layers DL can be realized by a multilayer perceptron and reduces the number of dimensions of the (optionally pooled) graph encoded data such that a vector denoting the searched indicator KPI is achieved.

According to embodiment, pooling has been done and for the dense layers DL the following activation function is used:

$$y = Relu(X_{pool} \cdot W_h) \cdot W_{out}$$

wherein y is the output of the dense layers, hence the sought for indicator, e.g., an acceleration versus fuel consummation. $X_{pool}$ is the pooled graph encoded data.

$W_h$ is the weight of layer h or in other words the set of parameters or weights of the connections or edges used in a hidden layer of a neural network for the edges from one layer to the node of another layer. An entry of this vector can be the weight of an edge leading from a node in layer h to another node in a different layer.

$W_{out}$ is the weight of the output layer, i.e., describes the weights of the edges leading from the last hidden layer to the output layer. $W_{out}$ and $W_{in}$ are both learned in the machine learning process.

Relu (rectified linear unit) is an activation function for the dense layers, which is used in an embodiment and performs well for the described example where indicators KPI are derived for a hybrid car architecture or another technical system such as transmission unit or a flying object, e.g., a quadcopter.

For each of node encoding module NEM, graph encoding module GEM, and output module OM exist many possible options, i.e., different realizations.

Variations in the Node Encoding Module of a Graph Neural Network

Figure 6:
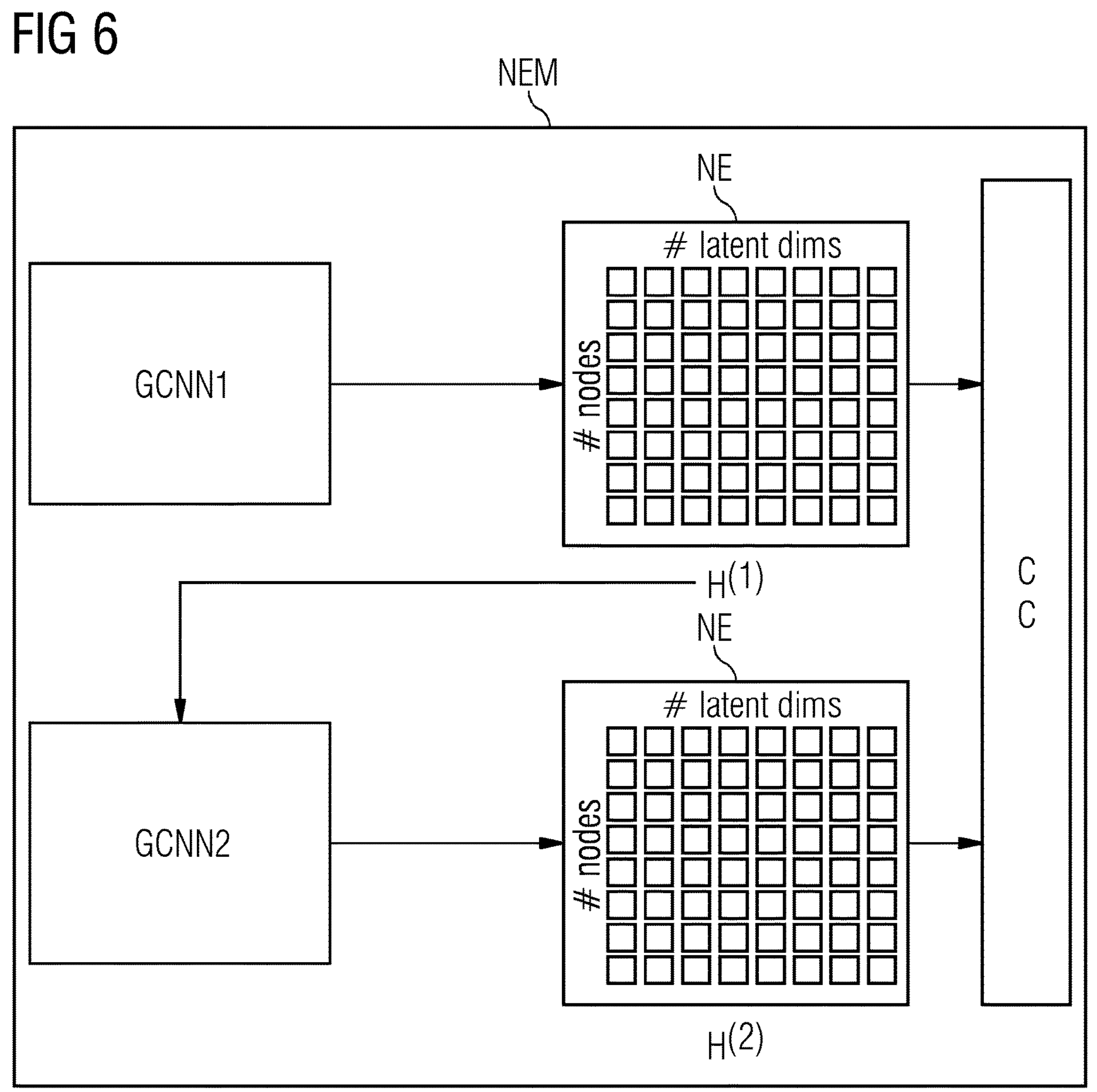
FIG. 6 shows a schematic overview of an iteration step for a machine learning process for obtaining a neural network architecture which describes a complex system.

As an example, the node encoding module NEM may also be comprised of several graph convolutional neural networks GCNN applied one on the output of the previous GCNN as depicted in FIG. 6 with a first graph convolutional neural network GCNN1 and a second graph convolutional neural network GCNN2. The described model learns vector representations for all nodes which capture the structural identity of each node (e.g., motors, batteries etc.) by encoding adjacency information.

Additionally, or optionally, the node encodings NE emerging from the respective GCNN, i.e., first graph convolutional neural network GCNN1 and second graph convolutional neural network GCNN2, can be concatenated CC in a predefined manner.

According to an embodiment, by the concatenation the focus is set differently for different nodes. This is done in that for nodes at the edges of a layer $2^{nd}$ order or higher orders are considered, whereas for nodes at the center only first order relations are considered or vice versa. By the concatenation then neighbored nodes can be considered differently for individual nodes.

Further exemplary node encoding module options are

Standard graph convolution where a convolutional operator is used, e.g.

$$H^{(l+1)} = \sigma\left(\tilde{D}^{-1/2}\tilde{A}\tilde{D}^{-1/2}H^{(l)}W^{(l)}\right)$$

wherein H is the representation of the nodes, l is a running variable denoting the number of latent dimensions in the graph convolutional neural network or the convolutional layer of the graph convolutional network. For l=0, $H^{(0)}$ represents node features, e.g., the type which might be e.g., "component" or the number and type of ports. H is iteratively updated and then represents for values l>0 also relations between the nodes.

σ is a sigmoid function which is used as an activation function of the GCNN.

The matrix $\tilde{D}^{-1}$ is used for normalization and can be derived from the input and a diagonal matrix.

$\tilde{A}$ is a matrix reflecting the topology of the data structure. For example, $\tilde{A}$ is an adjacency matrix which describes the connections between one node and another node for all nodes in the graphical representation, hence it represents essentially the link structure. $W^{(l)}$ is a parameter or weight denoting the strength of a connection between units in the neural network. The advantage of this convolutional operators is its basic form. The aggregation, i.e., gathering of information relevant for one specific node, is based on mean values.

Alternatively, other convolutional operators can be used that are tailored for a specific problem, e.g., for a description of vibrations in the chassis or also for a process where gases or liquids or piece good are produced by various transformation along a production line.

Graph convolution with attention mechanism: Generally spoken for the network architecture graph convolution layers are stacked, i.e., there are several hidden layers, i.e., layers between input and output layer. Specific nodes in these stacked layers, e.g., nodes of one layer, can attend features of neighbored nodes, e.g., in the same or in different layers. This has the effect, that different weights to different nodes in a neighborhood can be assigned, without requiring any complex calculations, e.g., matrix operations such as inversion or further knowledge on the graph structure.

Self loops or concatenation: As shown in FIG. 6 several graph convolutional neural networks may be used and the output thereof may be concatenated in a prescribed way. Alternatively, instead of or additionally to using more than one graph convolutional neural network, also the output of a graph convolutional neural network may again be fed into the same graph convolutional neural network, i.e., self-looped, and then concatenated.

Aggregation function (sum, mean, max): By aggregation the gathering of information relevant for one specific node is meant, see above. This may be based on mean values, sums of values or by taking the maximum values.

Number of layers: The number of hidden layers may be varied depending on the specific problem. According to an example, it would be started with one layer, many problems can be modelled using two hidden layers.

Dropout layers: Dropout works by randomly setting the neurons of a hidden layers to 0 during training. This prevents neurons from co-adapting too much and thus overfitting the model, i.e., describing it with more independent variables than actually needed. This is described in more detail by Srivastava et al. in the article "Dropout: A Simple Way to Prevent Neural Networks from Overfitting" which is published in Journal of Machine Learning Research 15 (2014), 1929-1958.

Jumping knowledge layers: This addresses the problem that the range of "neighboring" nodes that a node's representation draws from strongly depends on the graph structure. To adapt to local neighborhood properties and tasks, by jumping knowledge layers, for each node, different neighborhood ranges can be flexibly set to enable better representation of the complex system.

Variations of the Graph Encoding Module in Graph Neural Networks

With respect to the graph encoding module for the example shown in FIG. 5 the pooling P can done as max-pooling, i.e., considering only the strongest values. Alternatively, pooling P can be done that only values close to a mean value are considered etc., see below. Also, with regard to the combination of data, various combination schemes between attributes ATT and results of the pooling can be applied. According to the shown example the data that are output from the pooling P are just concatenated with the attributes.

Exemplary graph encoding module GEM options are

Simple pooling (sum, mean, max):

By applying pooling P on the data, the dimension of the data is reduced. Thus, by the pooling P the node representations for a variable number of nodes are compressed, in particular to a predefined size that can be processed further. Thus, an independence of the number of input nodes, which may vary, is achieved. A further advantage of the pooling is that a focus can be made on encoded information that is of particular interest and which might-due to encoding also information of distant nodes otherwise be disregarded.

As said, a pooling algorithm is to consider only maximum entries in a certain area, e.g., a row or line or sub-matrix, i.e., a matrix having lower dimension than the complete matrix, e.g., a 2×2 matrix out of a 16×16 matrix. This allows to focus on the most prominent values which often have the largest influence on relations between components.

According to an embodiment a pooling algorithm is used that $$r_i = \max_{n=1}^{N_i x_n}$$

Where x is a vector of the concatenated data matrix and r is the representation resulting from the pooling P. I is the number of dimensions pooled data can assume. $N_i$ is the number of rows of the concatenated data obtained in the concatenation. Thus, by the pooled data a representation is obtained that is independent of the original number of nodes, which depends on the technical system to be investigated and on what or which indicator in the technical system is of interest.

In this embodiment a maximum pooling considering only the maximum value is done. As was said, alternatively, other pooling methods such as taking a mean value or the sum of the regarded entries can be taken.

Hierarchical pooling, wherein the pooling is performed according to a defined relation, e.g., on the amount of information a node gives to a neighbor.

Attention based pooling: Therefore, attention weights are introduced for individual nodes in order to keep the most relevant information when pooling is performed.

Variations of the Training in Graph Neural Networks

The result of the training should be a neural network architecture that sufficiently good describes the relevant portions of the complex system CS so that the desired predictions can be made.

As an example, for the training of a graph neural network GNN that models a new car, e.g., hybrid car, available data sets from previous hybrid cars are taken. The data sets may be obtained from measurements or simulations. For a training a predefined first sub-set of the data set may be taken. To decide on the successful completion of the training a second sub-set of the data set, which has not been used for the training is taken. It is then investigated whether the graph neural network can also predict the indicators of the second sub-set correctly.

For the training there are training specific parameters, which need to be specified, which are e.g.:

Batch size: The batch size is a hyperparameter that controls the number of training samples before the model's internal parameters are updated, i.e., before the intermediate graph neural network is modified.

Learning rate: The learning rate controls how quickly the graph neural network is adapted to the specific system design. If the learning rate is small, then there are only small changes and more training epochs are required. Larger learning rates effect rapid changes and require therefore fewer training epochs.

Stopping criteria: It has to be decided, when the training of a neural network is stopped. What is used as stopping criterion is the following: The available training data are separated in different sets, at least one set for the training and a disjunct validation set for the testing how good the predictions made by the created intermediate graph neural network are. With ongoing training, one will experience an increase in the quality of predictions made for the validation until a certain point, when a decrease in the quality will start, meaning that the training data set is overfitted. This point can be used as stopping criterion.

Number of epochs: Is a hyperparameter, that controls the number of complete passes through the training data set. For example, it is assumed that there are 1000 samples (i.e., 1000 lines of training data samples), the batch size is 5 and there are 500 epochs. Then the data set is divided in 1000/5=200 batches, and the model will be updated 200 times. As there are 500 epochs, the intermediate graph neural network will go through the whole data set of 1000 samples 500 times. This results in a total of 1000*500 batches=500.000 batches during the entire training process.

Variations of the Output Module in Graph Neural Networks

With regard to the output module there are, e.g., the options:

Number of layers of the output model

Dropout layers (see above)

Number of hidden units, i.e., neurons per layer

To determine the ideal graph neural network GNN architecture, according to one aspect of embodiments of the invention is proposed to train a reinforcement learning agent to choose among the possible options.

By "ideal" a graph neural network architecture is meant which achieves prediction results for the specified problem lying within the specified boundaries, e.g., accuracy, training time etc.

Since the number of possible options for node encoding, graph encoding and output module is extremely large, searching over all possibilities how the GNN architecture is modified is practically infeasible. Random search will also lead to inadequate results as it is not informed by any of the commonalities between system types and would spend lots of time exploring architectures that perform poorly. By applying the concept of embodiments of the invention, these problems can be overcome.

Figure 7:
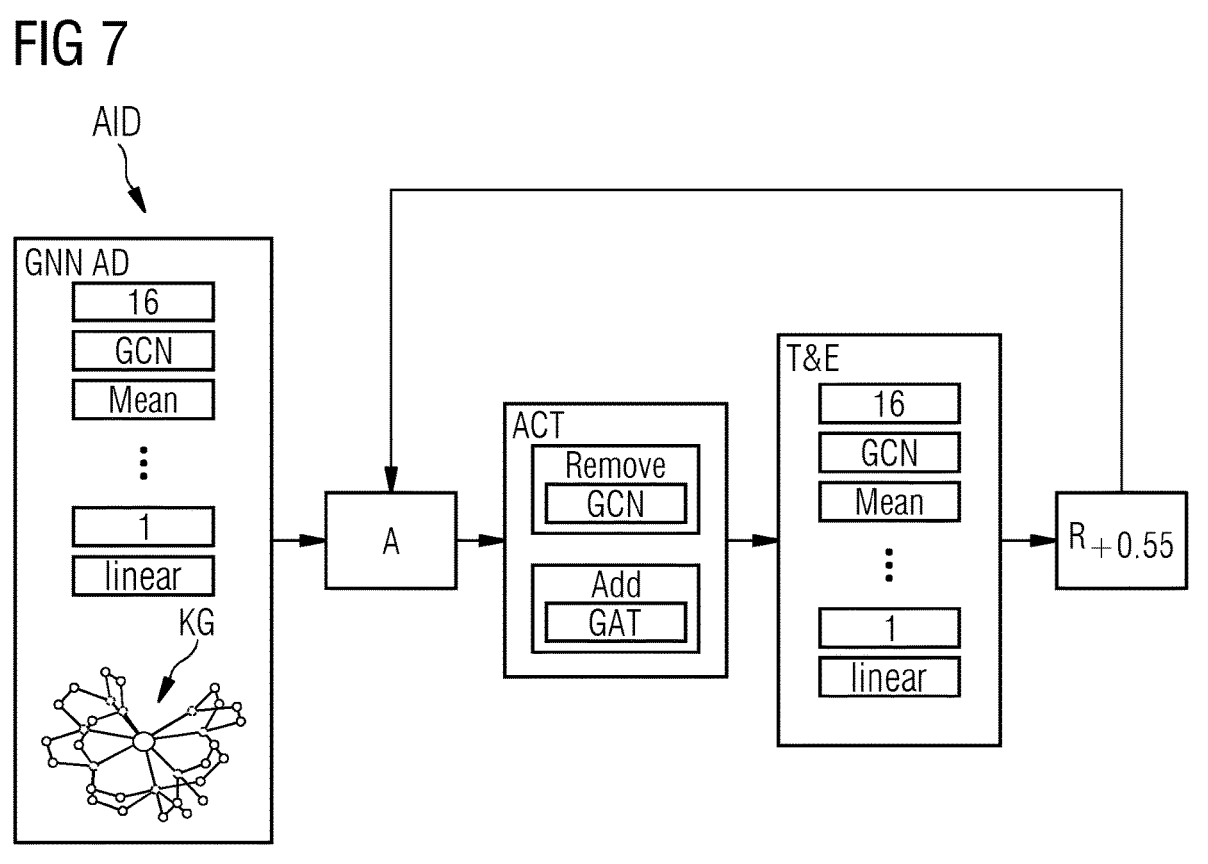
Figure 8:
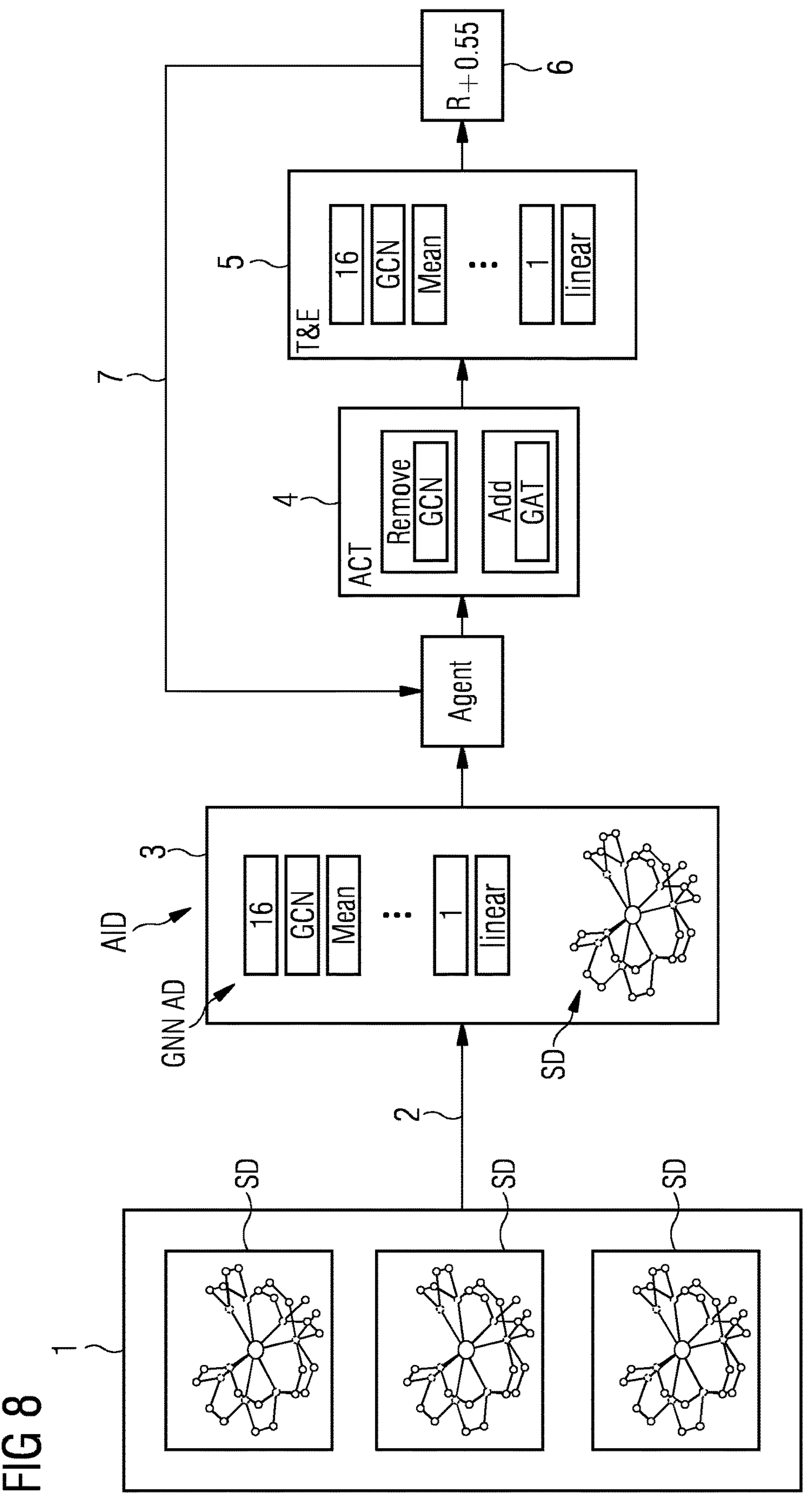
FIG. 8 shows a schematic overview of a reinforcement machine learning process in which an agent is created, which is able to find a suitable graph neural network architecture for an unknown system design.

Reinforcement Learning of the Agent (FIGS. 7 and 8)

For this reason, according to one aspect of embodiments of the invention, reinforcement learning is used to train the agent. In this process a reward signal provides feedback, whether an actual modification was useful for modeling a specific complex system CS. In other words, the modifications are conditioned on the properties of the complex system so that it can more efficiently and thoroughly explore highly performant architectures.

The procedure of how the agent A learns a policy is detailed in FIG. 7, where it is shown for one specific system design which is entered as agent input data AID. Once the agent is trained, the process shown in FIG. 7 is applied to unknown system designs and the agent applies the learnt policy, e.g., changes the network architecture in step ACT in an advantageous way.

In FIG. 7, the agent A receives as agent input data AID a description GNN AD of a start GNN architecture and the system description of the complex system CS as knowledge graph KG. These agent input data are taken out of a variety of start GNN architecture and a variety of system descriptions, see FIG. 8. Alternatively, the agent A starts with a fixed start GNN architecture, e.g., a very simple one.

"Agent" A denotes a computer program which is able to act autonomously within a well-defined range. The agent A in the context of embodiments of the invention may decide on the various options with regard to node encoding module NEM, graph encoding module GEM and output module OM and training parameters, as set out above. It may further decide on a starting architecture by consulting previously solved problems instead of using a predefined starting graph neural network. It may also decide on when an architecture is good enough, e.g., that the predictions are within the desired range. This range may be preset or defined while working on the problem depending on e.g., the work progress.

The agent A has a "policy" which will be explained further below. The policy determines how it should modify the GNN architecture to try and improve prediction performance. According to this policy, the agent A performs actions ACT on the GNN architecture. The exemplary actions ACT shown in FIG. 7 are to remove a graph convolutional layer GCN and instead add a graph attention layer GAT.

In a training and evaluation step T&E, the new GNN architecture is trained with training data for the specific complex system CS provided to the agent A and prediction performance for this complex system CS is calculated. In the shown example, the change the agent made has improved performance and therefore receives a positive reward R.

The reinforcement learning agent A generates a string that represents a GNN (graph neural network) architecture. For example, the string "16 GAT mean dropout 32 GAT mean" for the node encoder represents an architecture with two graph convolutional layer with attention using mean aggregation and a drop out layer in between. The output dimension of the first layer is 16 and the second is 32. The numbers 1 in the second last box from bottom and 16 in the top box mean the dimensionality of the particular neural network NN layer. Linear means that in the respective layer a "linear transformation" takes place, i.e., a matrix multiplication without non-linear activation function.

For each GNN architecture the agent A produces, the prediction performance of the GNN architecture is computed.

By prediction performance is meant how well the indicators, e.g., key performance indicators, of a complex system CS of interest can be predicted with relation to actual data, i.e., data gained from a real-world complex system such as a hybrid car. Alternatively to actual data, also data obtained from a simulation can be taken as reference value.

As an example, the prediction performance may be a difference between actual or simulation data and data produced by the current GNN architecture or any other sort of error function that indicates the strength of the deviation.

The reward for the agent A is defined as the performance improvement gained by modifying the GNN architecture. Positive rewards if the performance is improving and negative if the performance is decreasing. In the shown example in FIG. 7, the reward is positive because the performance has improved, i.e., the new intermediate graph neural network architecture can better model the actual system design.

Performance as a reward is not limited to the actual learning task performance, but could e.g., also take into account the memory-footprint or the training time of the GNN architecture. For example, the reward may be the difference between a previous error function from a previous GNN architecture and the current architecture.

According to another example, alternatively or additionally to that difference the training time of the respective GNN architecture may enter the reward function, e.g. (current error function*(training time current system/average training time)–previous error function (training time previous system/average training time).

As said above, the agent A is according to an embodiment provided with an initial baseline or starting GNN architecture as part of the agent's A input data AID and then produces actions ACT based on a learned policy to iteratively modify the elements of the GNN architecture. By learned policy is meant that in the course of setting up intermediate GNN architectures the agent has discovered which combinations of the options in the different modules meet best a specific problem or system design described by the knowledge graph KG of the complex system and hence result in an improvement of prediction performance and consequently positive reward. The agent may then fall back on the experiences made with previous GNN architectures.

This training process which results in the agent's policy and which has been also been explained with regard to FIG. 7, is also depicted in FIG. 8.

In a first step 1, a set of different system designs is provided as part of the agent's A input data AID.

In a second step 2, the agent samples, i.e., takes, one system design at a time, which is fully or partly described by a knowledge graph KG and optionally a start GNN architecture. The system designs refer to a similar technical area, e.g., vehicles with a similar drive/propulsion unit if e.g., the desired indicators are in the context of the drive/propulsion function. One advantage is that the system designs SD comprising knowledge graphs KG and optionally the attributes ATT, which may apply only for individual nodes, e.g., motor properties, can be derived not only from real world data but also from simulation data. By the reliant transfer learning of the agent thus costly real-world experiments can be reduced.

In a third step 3 the agent starts the design process for the GNN from the start GNN architecture and the sampled system design.

Then the following loop is performed: In a fourth step 4 the agent performs actions which alter the basic or start GNN architecture.

The thus obtained intermediate GNN architecture is in step 5 trained and the predicted indicators for the sampled system design achieved with this intermediate GNN architecture are evaluated with respect to the actual, e.g., measured, values of this or these indicator(s).

Depending on the amount of improvement in this cycle or loop, i.e., how much better the predictions were with this intermediate GNN architecture in comparison to the previous GNN architecture obtained in the previous cycle, a reward function is calculated in step 6.

Then, at least one iteration takes place until an intermediate GNN architecture is obtained, that meets predefined requirements such as prediction accuracy of the indicators or required length of the training.

In order that the agent A acquires a policy this process repeated for all or a subset of the system designs.

After having acquired a policy the agent A can provide for an unseen system design USD, i.e., a system that has not been part of its training, an output GNN architecture that can sufficiently well model the unseen system design USD, i.e., make appropriate predictions for indicators.

Figure 9:
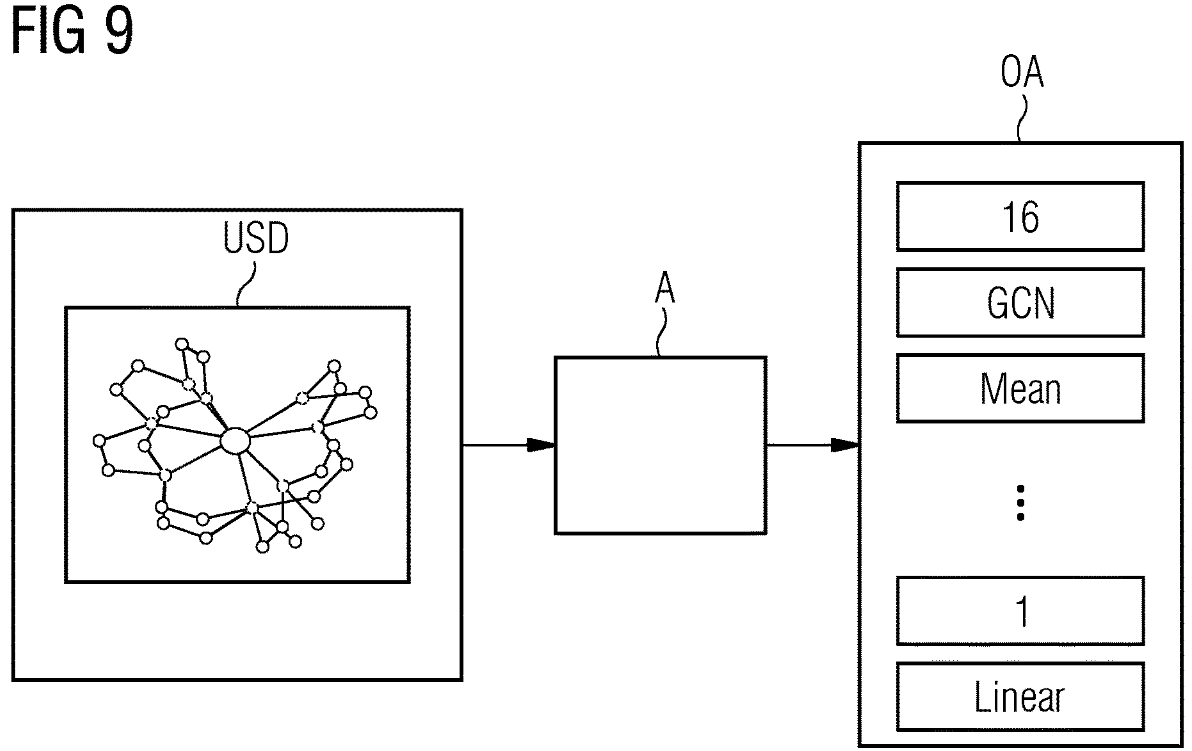
FIG. 9 shows a result neural network architecture achieved by an agent trained by a machine learning method for a system design that has not been part of the training data.

Then the intermediate GNN architecture becomes the output architecture. This result is depicted in FIG. 9, where the agent provides for a system design the suitable output GNN architecture OA.

Training

The agent is thus trained to generalize to different types of systems described in the standardized data model. This is done by randomly sampling a system for each episode the RL agent is trained.

After each iteration, the GNN architecture is trained, performance is evaluated, and a reward is provided, see FIG. 8. The agent is able to observe the current state of the GNN architecture, and also the graph representation of the complex system see FIG. 8.) Since the complex systems are all described using the same standardized ontology, the agents policy can more easily generalize between the different system types. This leads to faster convergence to highly performant GNN architectures.

This process is usually carried out many thousands of iterations to train the agent to make good decisions about how to modify the GNN architecture such that prediction performance for a wide variety of system types improves.

As a result, the agent A provides a GNN architecture that should be "near" optimal architecture output with regard a system design, that has not been trained. In other words, the policy learnt allows the agent to provide GNN architectures for unseen systems and thus transfers what was learnt during the training of the agent when receiving unseen system input USD, see FIG. 9.

Advantages

One primary advantage is that a machine learning expert is not required to design new machine learning models for each possible system type. This reduces the time to develop a machine learning solution. Moreover, better machine learning solutions can be achieved, as much more relations in the provided set of system designs can be explored. In other words, without this technology, a solution may only be able to roll out this kind of fast feedback loop for commonly seen system types, i.e., by embodiments of the invention solutions can be found that have not been found before, as the respective parameter regimes have not been investigated, e.g., because relations were unknown.

In consequence, engineers can receive fast and mostly more comprehensive feedback on their designs regardless of the type of system they are designing. Depending on the application domain this can mean different things. In the space of vehicle design, that could lead to overall, e.g., more fuel-efficient designs, long ranges for electric vehicles, or less product failures in the field.

OTHER EMBODIMENTS

Although embodiments of the present invention have been described in accordance with embodiments or aspects thereof, it is obvious for the person skilled in the art that modifications or combination between the embodiments, fully or in one or more aspects, are possible in all embodiments.

The proposed methods can be performed by a computer, computer system, embedded computer or any electronic circuit.

Parts of the description have been presented in terms of operations performed by a computer system, using terms such as data and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, routers, bridges, switches, and the like, that are standalone, adjunct or embedded.

Additionally, various operations will be described as multiple discrete steps in turn in a manner that is helpful to understand embodiments of the present invention. However, the order of description should not be construed as to imply that these operations are necessarily order dependent, in particular, the order of their presentation.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the context of this application, the design produced by using a graph neural network architecture as provided by the agent is applied to manufacture e.g., a new hybrid car, an electronic component or circuit, electric design, design of a production street, design of a molecule etc. or parts thereof, if it suffices the requirements for the respective product, e.g., in view of functionality. Thus, the efforts in manufacturing and hence the costs can be reduced because the design obtained by the engineering tool can be analyzed in the relevant aspects beforehand.

As said, the agent may be performed on a computer or computer system on which the instructions of the piece of software can be at least partly performed.

The term "computer" may refer to a local processing unit, on which the client uses the engineering tool for designing purposes, as well as to a distributed set of processing units or services rented from a cloud provider. Thus, the term "computer" covers any electronic device with data processing properties, e.g., personal computers, servers, clients, embedded systems, programmable logic controllers (PLCs), FPGAs, ASICs handheld computer systems, pocket PC devices, mobile radio devices, smart phones, devices or any other communication devices that can process data with computer support, processors and other electronic devices for data processing.

Computers may comprise one or more processors and memory units and may be part of a computer system where various computers are connected with each other or/and other devices. Further, the term computer system includes general purpose as well as special purpose data processing machines, routers, bridges, switches, and the like, that are standalone, adjunct or embedded.

The term "user" may in particular refer to an individual, a group of individuals sharing at least a part of properties or features or a company.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for providing an agent for creating a graph neural network architecture, the graph neural network architecture being suitable for providing a prediction of at least one indicator of a complex system (CS), said method comprising:

a) providing a variety of system designs, each system design describing a unique complex system (CS) in a standardized data model whereby a standardized language is used for describing elements of the unique complex system (CS) and relations between the elements, to the agent, wherein each system design is described in a knowledge graph comprising nodes and edges between the nodes, and wherein components and relations of the unique complex system (CS) are described by the nodes and edges and/or at least one group of attributes (ATT) that refers to a subset of the nodes and edges;

b) sampling, by the agent, one system design out of the variety of system designs;

c) starting, by the agent, an iterative process from a starting graph neural network architecture and the sampled system design with the following:

i) modifying the starting graph neural network architecture and thus obtaining an intermediate graph neural network architecture;

ii) training the intermediate graph neural network architecture, with training data for the sampled system design described by the nodes and the edges and/or the at least one group of attributes (ATT), to make a prediction of at least one technical indicator for the sampled system design and evaluating a quality of the prediction, wherein during the training, the agent is learning a policy in which modifications of the intermediate graph neural network architecture are conditioned on a description of components and relations of the unique complex system (CS), by nodes and edges and/or at least one group of attributes (ATT), specific to the one system design;

iii) deriving a reward value, whereby the quality of the prediction is considered;

iv) repeating the steps i)-iii) with the intermediate graph neural network architecture as a new starting graph neural network architecture until an exit criterion is met;

d) repeating step b) in that another system design is sampled and repeating step c) until an agent training exit criterion is met, resulting in the agent having learned the policy, wherein the learned policy identifies modifications of a graph neural network architecture conditioned on description by nodes and edges and/or at least one group of attributes (ATT) specific to the system designs; and e) after the agent training exit criterion has been met, providing a graph neural network architecture by the agent applying the identified modifications in the learned policy to nodes and edges and/or at least one group of attributes (ATT) describing an unknown system design, followed by the modified graph neural network architecture providing one prediction of the at least one technical indicator for the unknown system design, wherein the policy determines how to modify the graph neural network architecture to improve the one prediction of the at least one technical indicator for the unknown system design.

2. The method according to claim 1, said method comprising: creating, by the agent, a suitable graph neural network architecture, the suitable graph neural network architecture being suitable for providing a prediction of at least one technical indicator of an unknown complex system (CS), said creating the suitable graph neural network architecture comprising:

a) sampling, by the agent a system design of the unknown complex system (CS);

b) starting, by the agent, an iterative process from an initial graph neural network architecture and the sampled system design of the unknown complex system (CS) with the following:

i) modifying the initial graph neural network architecture and thus obtaining one intermediate graph neural network architecture;

ii) training the one intermediate graph neural network architecture, with training data for the sampled system design of the unknown complex system (CS), performing the prediction for the sampled system design of the unknown complex system (CS) and evaluating a quality of the prediction for the sampled system design of the unknown complex system (CS);

iii) deriving, from the quality of the prediction for the sampled system design of the unknown complex system (CS), a reward;

iv) repeating the steps i)-iii) with the one intermediate graph neural network architecture as a next starting network architecture until the exit criterion is met; and c) taking the last intermediate graph neural network architecture as the suitable graph neural network architecture.

3. The method according to claim 1, wherein the components and relations of the complex system (CS) are described by the nodes and edges and the at least one group of attributes (ATT) that refers to a subset of nodes and edges.

4. The method according to claim 1, wherein the modifying of the starting graph neural network architecture is a removing or/and adding of components of a node encoding module for encoding node specific information, in particular at least one of the following:

a standard graph convolution component;

a graph convolution with attention mechanism component;

a self-loop or concatenation component;

an aggregation function (sum, mean, max) component;

a number of layers component;

a dropout layers component; and a jumping knowledge layers component.

5. The method according to claim 1, wherein said modifying of the starting graph neural network architecture is a removing or/and adding of components of a graph encoding module for encoding information relevant for a plurality of nodes, in particular at least one of the following:

a simple pooling component taking a sum, a mean or a maximum value;

a hierarchical pooling component; and an attention based pooling component.

6. The method according to claim 1, wherein said modifying the starting graph neural network architecture is a removing or/and adding of components of an output module for providing the prediction of the technical indicator, in particular modifying at least one of the following:

a number of layers component;

a dropout layer component; and a number of hidden units per layer component.

7. The method according to claim 1, wherein the training of the intermediate graph neural network is performed with training data obtained from simulations of the unique complex system (CS) or actual data measured at the unique complex system (CS) or/and wherein the training data are divided into at least two subsets and a first share of the subsets is used for the training and a second share of the subsets is used for evaluation of the success of the training, in particular by determining the quality of the prediction.

8. The method according to claim 1, wherein quality of the prediction is evaluated by comparing the predicted at least one technical indicator with an actual or simulated technical indicator and considering the difference between these entities.

9. The method according to claim 1, wherein the reward value is determined in relation to how much better the prediction is for the intermediate graph neural network than for the previous intermediate graph neural network.

10. The method according to claim 1, wherein the exit criterion is defined as that a predefined quality of the prediction, in particular at least one of an accuracy, or property of the training process, in particular a training time, is achieved.

11. A non-transitory computer readable storage medium storing the agent for performing the method according to claim 2, whereby the agent is trained with the method.

12. A computing system for providing the agent in conjunction with performing the method according to claim 2, wherein the computing system comprises at least one processing unit, a storage unit, and a communication interface.

13. A computer program product, comprising a computer readable hardware storage device having computer readable program code stored therein, said program code executable by a processor of a computer system to implement a method for performing a method according to claim 1.

14. Non-transitory computer readable storage media with a computer program product according to claim 13.

15. The method according to claim 1, wherein the one prediction is an improvement in comparison with a prediction of at the least one technical indicator of the unknown system design that would be made by the graph neural network architecture not modified.

16. The method according to claim 1, wherein neurons in hidden layers of the intermediate graph neural network architecture are randomly set to zero during said training to prevent overfitting the intermediate graph neural network architecture.

17. The method according to claim 3, wherein the training data for the sampled system design is described by the nodes and the edges and the at least one group of attributes (ATT), wherein the agent is learning the policy in which the modifications of the intermediate graph neural network architecture are conditioned on resulting in the agent having learned the policy, wherein the learned policy identifies modifications of a graph neural network architecture conditioned on description by nodes and edges and at least one group of attributes (ATT) specific to the system designs, and wherein after the agent training exit criterion has been met, the graph neural network architecture is provided by the agent applying the identified modifications in the learned policy to the nodes and edges and the at least one group of attributes (ATT) describing an unknown system design.

* * * * *